United States Patent [19]

Ciuffetelli

[11] Patent Number: 4,717,307

[45] Date of Patent: Jan. 5, 1988

[54] APPARATUS FOR SUPPLYING COMPOST TO MUSHROOM GROWING BEDS

[76] Inventor: Andrew J. Ciuffetelli, 813 Merrimac La., Unionville, Pa. 19375

[21] Appl. No.: 782,764

[22] Filed: Oct. 1, 1985

[51] Int. Cl.⁴ .......................... A01G 1/04; B65G 65/28
[52] U.S. Cl. ........................................ 414/300; 47/1.1; 414/272; 414/343; 414/495
[58] Field of Search .................. 414/152-154, 414/157, 163, 172, 179, 293, 299, 300, 301, 303, 340, 343, 495, 501-503, 272, 273, 281, 282; 47/1.1; 198/435, 535, 574, 536, 369, 312, 315, 320, 316.1, 861.1

[56] References Cited

U.S. PATENT DOCUMENTS

| | | | |
|---|---|---|---|
| 805,801 | 11/1905 | Kline | 47/1.1 |
| 1,726,603 | 9/1929 | Allen | 414/299 |
| 2,345,328 | 3/1944 | Conway et al. | 414/528 X |
| 3,048,282 | 8/1962 | Reiff et al. | 414/272 |
| 3,052,364 | 9/1962 | Pelzer | 414/272 |
| 3,185,320 | 5/1965 | Chasar et al. | 414/282 |
| 3,292,305 | 12/1966 | Stengel | 47/1.1 |
| 3,482,712 | 12/1969 | Powers | 414/273 |
| 3,490,615 | 1/1970 | Sackett, Sr. | 414/272 |
| 3,735,885 | 5/1973 | Comfort | 414/503 |
| 3,822,794 | 7/1974 | Fougea | 414/272 X |
| 3,936,975 | 2/1976 | de Winter | 47/1.1 |
| 4,273,495 | 6/1981 | Pannell | 414/301 X |
| 4,285,623 | 8/1981 | Stephens | 414/282 X |
| 4,371,305 | 2/1983 | Pannell | 414/300 |

Primary Examiner—Joseph E. Valenza
Assistant Examiner—David A. Bucci
Attorney, Agent, or Firm—Robert C. Podwil

[57] ABSTRACT

Apparatus for distributing compost to the beds of a mushroom house includes a mobile, freestanding, selectively positionable distributor, which receives compost and using a conveyor mounted upon it, distributes the compost to the beds. The distributor is fed from above, by a movable guide supported above the distributor, the guide being so positioned and arranged as to direct material onto the conveyor of the distributor. The guide, in turn, is supplied by a system of conveyors, which transport material from a receiving point to the guide.

8 Claims, 5 Drawing Figures

APPARATUS FOR SUPPLYING COMPOST TO MUSHROOM GROWING BEDS

BACKGROUND OF THE INVENTION

This invention relates to apparatus for supplying compost to mushroom growing beds, and more particularly, to apparatus which enables a mushroom grower to uniformly, and relatively rapidly, distribute compost or other granular material to the beds of a mushroom house.

In one commonly used technique for mushroom culture, mushrooms are grown in buildings, so-called "mushroom houses" which house tiers of shelves, the shelves providing support for the beds in which mushrooms are grown. In the course of cultivation, the beds are supplied with a compost growing medium, which, later in the cultivation process, is covered by a "casing" of soil.

Although subject, of course to individual variations, the beds of a mushroom house are usually about five feet wide, and on the order of sixty feet long. The beds are typically arranged in vertical tiers, several feet high, with the individual shelves spaced from each other by approximately two feet. The tiers of shelves are usually spaced from each other by relatively narrow aisles to take maximum advantage of available floor space. The space constraints resulting from the foregoing arrangements create practical difficulties in transporting and distributing compost to the beds.

Mechanized spreaders for compost and other materials relating to mushroom culture have heretofore been proposed. For example, in U.S. Pat. No. 3,936,975, to deWinter, issued Feb. 10, 1976, a mushroom growing bed is itself supported by a movable web, the movement of which serves to transport the growing medium. U.S. Pat. No. 4,273,495, to Pannell, issued June 16, 1981, discloses another apparatus which uses a moving belt associated with a bed. A cross-conveyor, cable-supported and vertically adjustable by means of a winch, is used to discharge compost to the belt.

In conventional practice, however, compost is distributed in mushroom houses in the following manner: compost is picked up by a front-end loader and deposited in a feeder, which then distributes the compost to a movable conveyor. The conveyor, in turn, transports the compost into the mushroom house, typically to a location adjacent to the section of the bed to be filled. The conveyor then feeds the compost to a distributor, and the material is then manually or mechanically distributed throughout the bed.

The present invention provides an apparatus in which the need for manipulation and positioning of the feed conveyor within the limited confines of the mushroom house, among the tiers and beds, is eliminated. The invention achieves these objects by providing a movable guide, physically separated from the distributor and located away from the tiers and beds, which receives compost from the feed conveyor. The guide, in turn, directs the compost to a movable distributor, the distributor itself being adapted to traverse the length of the beds to apply compost to the beds more uniformly then is accomplished with presently used apparatus.

SUMMARY OF THE INVENTION

The objects of the invention are realized, in a presently preferred form of the invention, by apparatus which comprises a selectively positionable floor-supported distributor, which may selectively be positioned with respect to the beds to dispense compost to them, and associated apparatus to facilitate the supplying of compost to the distributor. The associated apparatus comprises a movable guide, movably supported on a surface above the distributor, and positionable in vertical registry with the distributor to permit material to fall from the guide to the distributor. One or more feed conveyors convey material to the guide.

The distributor includes, in its presently preferred form, a chassis or base portion and a vertically adjustable carriage mounted on the base portion. The carriage carries a conveyor for dispensing the compost from the distributor to the beds. Selective vertical adjustment of the carriage adjusts the point of discharge of the conveyor to the heights of the beds.

In its presently preferred form, the guide comprises a shell having a hopper portion for receiving material from the feed conveyor, and a body portion of reduced cross section, the cross section of the body portion corresponding generally to the dimensions of the conveyor on the distributor. Guide surfaces are associated with the conveyor on the distributor, and serve to direct and guide compost to the conveyor of the distributor for accurate and preferably continuous delivery to the beds.

Remote electrical controls are preferably provided, to enable an operator stationed near the distributor to selectively position the distributor and guide, and to coordinate operation of the feed conveyors and the distributor-mounted conveyor.

There are seen in the drawings, forms of the invention which are presently preferred (and which represent the best mode contemplated for carrying the invention into effect), but it should be understood that the invention is not limited to the precise arrangements and instrumentalities shown.

DESCRIPTION OF DRAWINGS

FIG. 1A is a partial side elevation view showing alternative details of apparatus in accordance with the invention.

DETAILED DESCRIPTION

Figure 1:
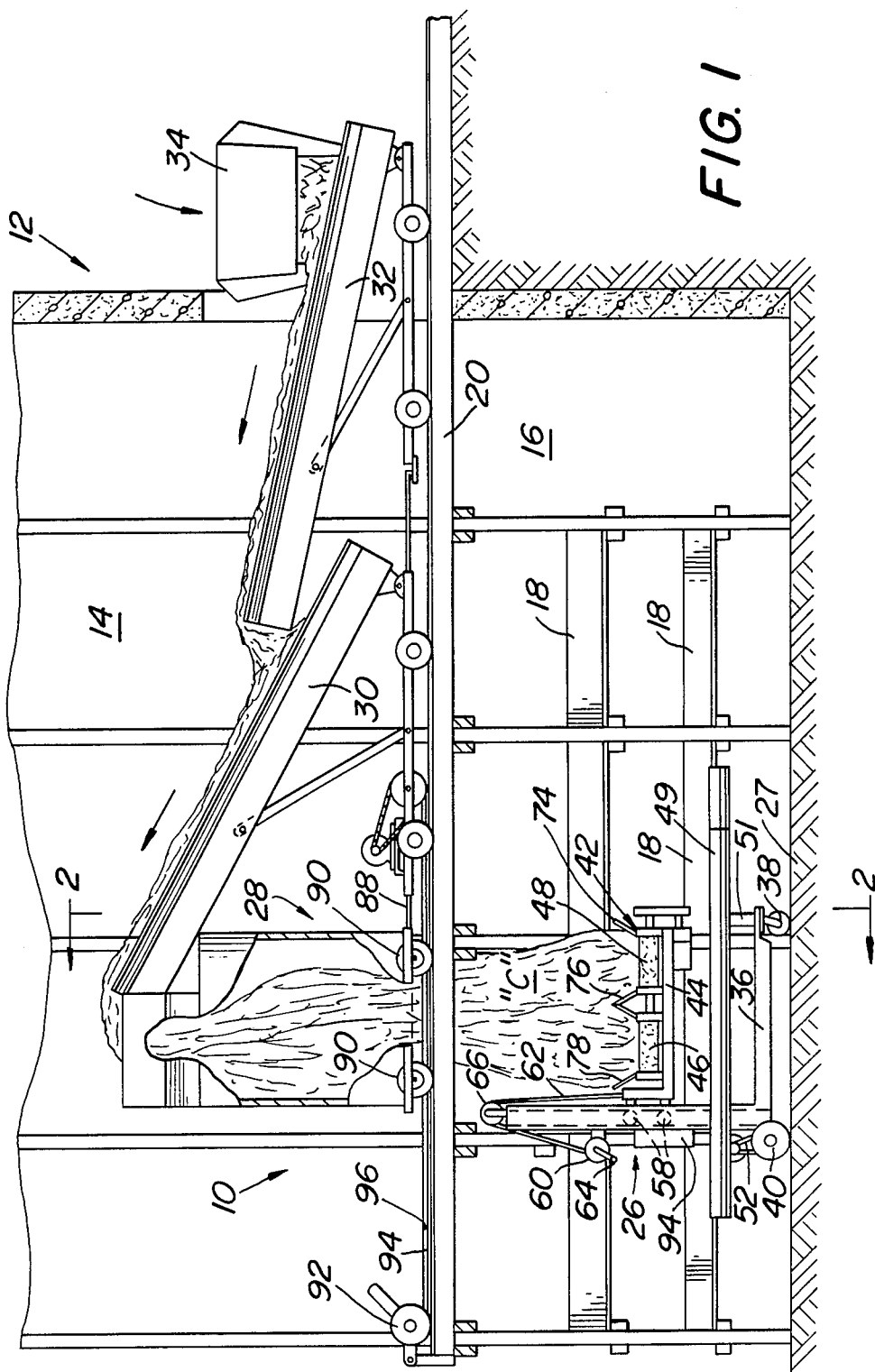
FIG. 1 is a side elevation view, depicting apparatus, in accordance with the invention, for distributing compost to mushroom growing beds.

Referring now to the drawings in detail, wherein like reference numerals indicate like elements, there is seen in FIG. 1 apparatus, designated generally by the reference numeral 10, for distributing compost to the beds of a mushroom house. The mushroom house, itself designated generally by the reference numeral 12, includes an upper story 14, which provides a receiving area for bulk material to be used in the house 12, and a lower story 16, in which there are disposed mushroom growing beds 18.

Figure 2:
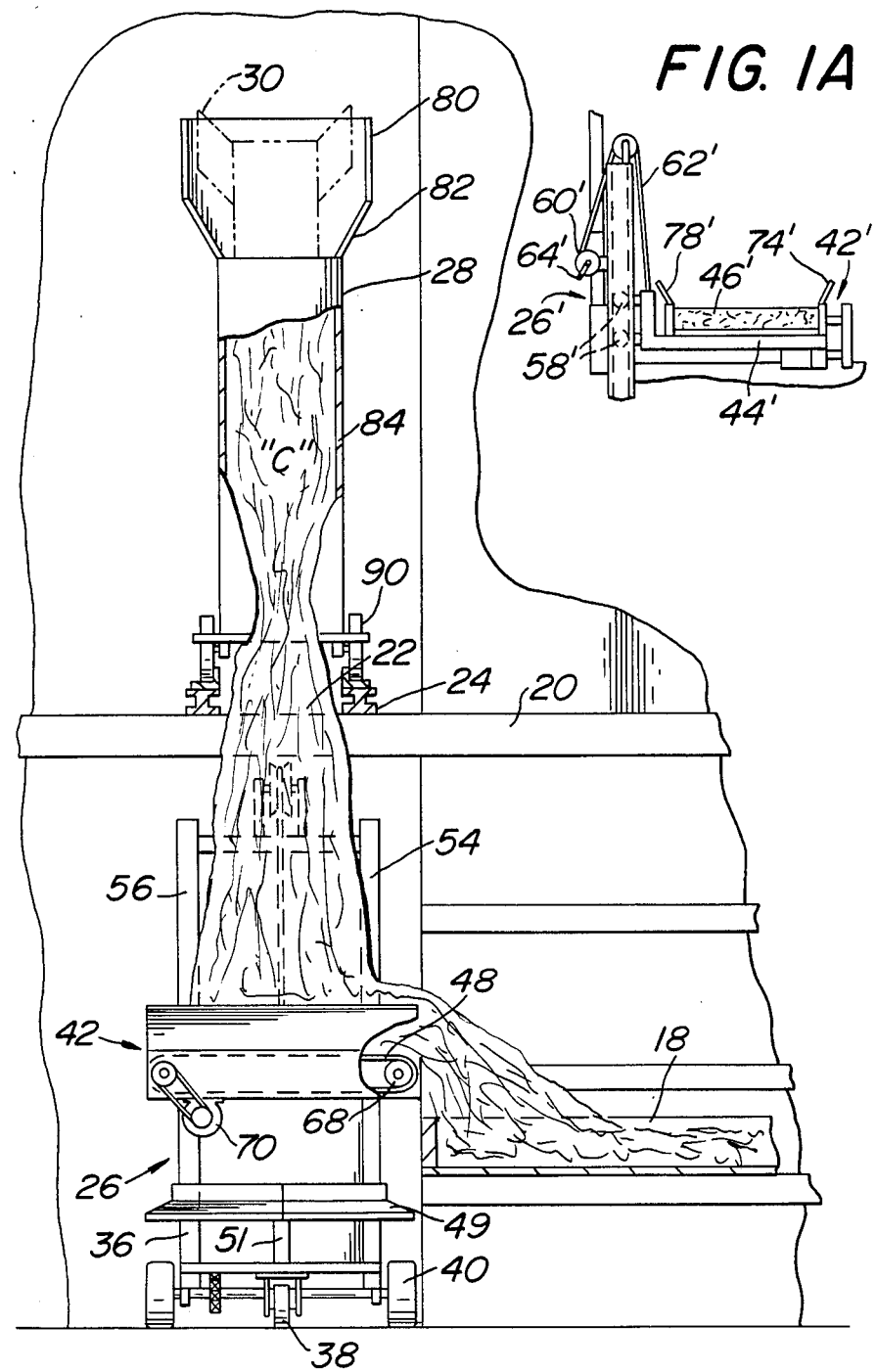
FIG. 2 is an end elevation view, taken substantially along the lines 2—2 in FIG. 1.

Referring to FIGS. 1 and 2, the upper story 14 provides, in association with its floor supporting beams 20, an elongated opening, or slot, 22, through which material may pass from the upper story 14 to the lower story 16.

Associated with the opening 22 is a pair of tracks 24, the purpose and function of which are explained below.

In the usual case, the mushroom house 12 will have multiple tiers of growing beds 18, vertically spaced from each other. The present apparatus provides a means for quickly, efficiently, and evenly supplying compost to the growing beds 18. In this regard, there is provided a compost distributor designated generally by the reference numeral 26, which is capable of supplying compost to the different beds, and, selectively, to different areas of the beds.

Compost is supplied to the distributor 26 by means of a movable guide 28, supported on flanged tracks 24 of the upper story 14, and capable of being moved in vertical registry with the distributor 26, the distributor 26 being supported by a floor 27 of the lower story 16 of the mushroom house 12.

Compost is supplied to the guide 28 by conveyor, such as the illustrated conveyors 30 and 32, the material being supplied to the conveyor 32 from outside the mushroom house 12 by conventional feed apparatus 34.

The distributor 26, which will now be described in detail, comprises a chassis, or base portion 36, supported by wheels 38 and 40. In the illustrated form of the distributor 26, the wheel 38 is a castering idler, and the wheels 40 are, in a manner which will be explained, driven.

Operatively coupled to the base portion 36 of the distributor 26, and vertically adjustable with respect to it, is a carriage assembly, designated generally by the reference numeral 42. Mounted on the carriage assembly 42, and operable in directions extending transversely with respect to the base portion 36, is a conveyor 44, which includes, in the illustrated form of the invention, a pair of endless belts 46, 48, disposed side-by-side and extending transversely with respect to the base portion 36 and carriage assembly 42.

As is seen in FIG. 1, and in cross-section in FIG. 2, the base portion 36 is provided, at its respective sides, with side protectors, or guides 49, which serve as bumpers to maintain alignment of the distributor 26 with the aisle between the beds 18, and limit impact between the distributor 26 and surrounding structures. Suitable supports, such as the support 51 seen in FIGS. 1 and 2, may be provided for the side protectors, or guides 49.

Figure 3:
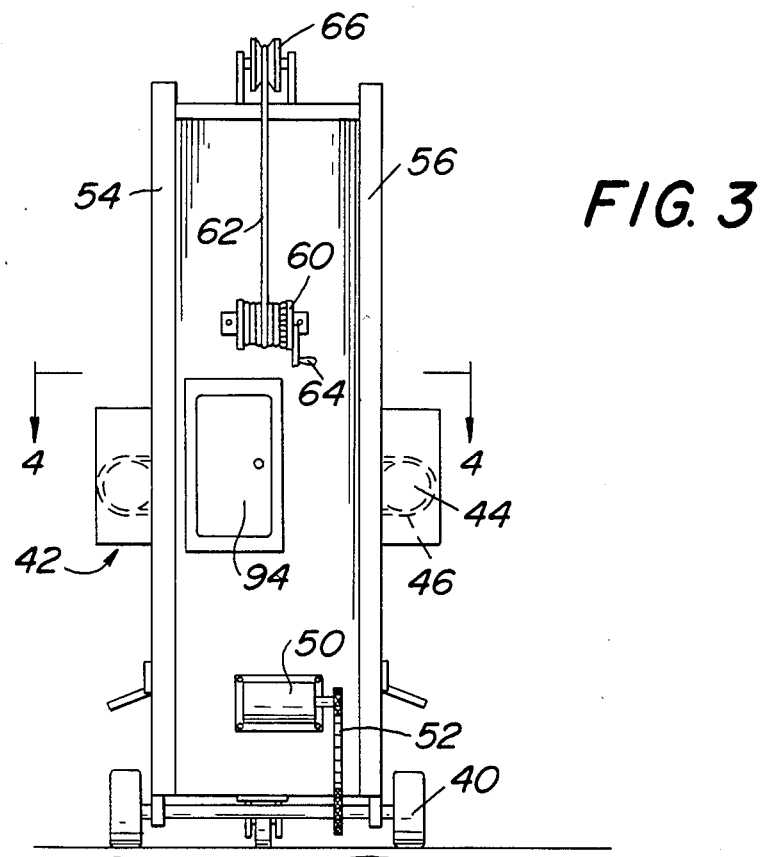
FIG. 3 is an end elevation view, taken from a direction opposite to the direction of FIG. 2, of a compost distributor in accordance with the invention.
Figure 4:
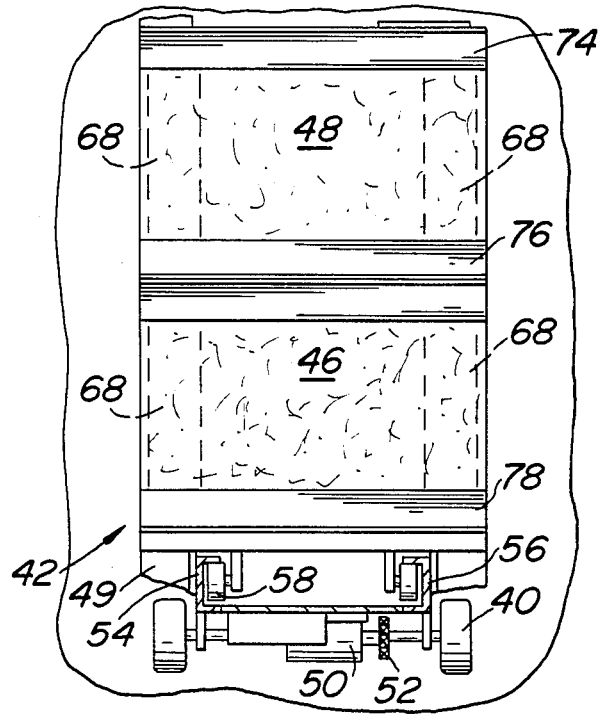
FIG. 4 is a vertical cross-sectional view, taken along the line 4—4 in FIG. 3.

Referring to FIGS. 1, 3 and 4, an electric motor 50, drivingly coupled to the wheels 40 by means of a chain 52 or other equivalent drive, facilitates selective movement of the distributor 26 in response to operation of an electrical control, to be generally described later.

The base portion 36 of the distributor 26, in the illustrated form of the invention, is provided with a pair of upright guide rails 54 and 56, arranged to receive complementally sized and shaped guide rollers 58 associated with the carriage assembly 42. A ratcheted winch assembly 60, mounted on the base portion 36 and coupled to the carriage assembly 42 by means of a pulley-supported cable 62, provides a means for selective vertical adjustment of the carriage assembly 42. In other words, referring to FIGS. 1 and 3, operation of the winch 60 by means of a handle 64 (or other means) causes the cable 62 to run over a pulley 66 to, in effect, lengthen or shorten the cable 62, thereby causing the carriage assembly 42 to be raised or lowered with respect to the base portion 36. Adjustment of the height of the carriage assembly 42, it will be observed, enables a user of the apparatus 10 to place the carriage 42, and hence the conveyor 44 which it carries, in vertical registry with a selected growing bed 18.

Referring to FIGS. 1, 2 and 4, the conveyor 44 associated with the carriage assembly 42 is so oriented with respect to the base portion 36 that material such as the compost "C" seen in FIGS. 1 and 2, when placed on the conveyor 44, may be dispensed laterally with respect to the base portion 36 (as best seen in FIG. 2) into a bed 18. The belts 46 and 48 of the conveyor 44, in the illustrated form of the invention, are mounted on spaced sheaves or rollers, such as the roller 68 seen with respect to the base portion 36 in FIG. 2. As is also seen in FIG. 2, at least one of the rollers 68 is driven, as by the illustrated motor 70 and drive belt 72. As will be explained later, the motor 70 is advantageously of a reversible type, enabling the conveyor belts 46 and 48 to be selectively reversed, thus enabling the distributor 26 to feed beds 18 disposed on either side of the distributor 26.

Referring now to FIGS. 1 and 4, the conveyor belts 46 and 48 are preferably disposed between guide baffles 74, 76 and 78, which serve to retain granular material on the conveyor 44, and guide it into engagement with one or the other of the conveyor belts 46 and 48. The guide baffle 74, for example, as is perhaps best seen in FIG. 1, has its upper face angled inwardly toward the belt 48, so that it tends to catch material which might otherwise fall beyond the conveyor 44, and guide that material toward the conveyor belt 48. The guide baffle 76, as will also be seen in FIG. 1, has an inverted "V" cross-section, so that portions of its upper surfaces are angled toward the conveyor belts 46 and 48, respectively. The guide baffle 76 thus prevents material on the conveyor 44 from falling between the belts 46 and 48; it guides material toward one or the other of the belts 46 and 48. The guide baffle 78, like the guide baffle 74, has an upper surface angled inwardly toward a conveyor belt, in this instance, the conveyor belt 46.

In FIG. 1A, there is seen an alternative form of the invention, in which elements corresponding to those previously described are designated by like, primed (') reference numerals. The embodiment of FIG. 1A has a single conveyor 46', disposed between guide baffles 74' and 78'.

The novel apparatus by which, in accordance with the invention, granular material such as compost is fed to the distributor 26, will now be described.

Referring to FIGS. 1 and 2, the above-mentioned movable guide 28 serves to direct material to the distributor 26, and more specifically, to the conveyor 44 of the distributor 26, reliably and accurately, without the need for substantial manual intervention. In this regard, it will be seen that the guide 28 receives material from the conveyor 30 at a relatively broad upper section, which may be referred to in terms of its function, as a "hopper" portion 80. The width of the hopper portion 80 of the guide 28 enables the guide 28 to catch substantially all of the material which emerges from the conveyor 30. A transition portion 82, of tapered and decreasing cross-section, fairs the hopper portion 80 into a body portion 84 of reduced cross-section, the cross-section being correlated to the dimensions of the conveyor means 44 of the distributor 26. Thus, as is seen in FIGS. 1 and 2, material emerging from the guide 28 is constrained by the dimensions of the body portion 84 of the guide 28 to an area smaller in length and width than the horizontal dimensions of the conveyor 44.

The tracks 24 associated with the opening 22 between the upper story 14 and lower story 16 of the mushroom house 12 are so directed as to run parallel to the sides of the beds 18, and accordingly, are parallel to the path of movement of the distributor 26 below. If, as is depicted in FIG. 1, the guide 28 is maintained in vertical registry with the distributor, material passing through the guide naturally falls to the desired position on the conveyor 44, for disposition by the conveyor 44 to the bed 18 as illustrated in FIG. 2. To facilitate positioning of the guide 28, the guide 28 is provided with wheels 90, the "gauge" of which corresponds to the spacing of the tracks 24. The tracks 24 are preferably suitably flanged, as seen in FIG. 2, to provide directional guidance for movement of the guide 28.

The guide 28 may be coupled to the conveyor 30 by means of a coupling or hitch 88, and a winch 92 and cable 94 may be provided in association with the upper story 14 of the mushroom house 12 to facilitate movement of the guide 28 and the conveyor 30.

The manner in which the apparatus 10 operates to supply compost to the beds 18 should now be apparent. Compost may be picked up with a front end loader or other means, and dumped into a feeder such as the feed apparatus 34. The conveyors 30 and 32 carry the material to a position above the section of the beds 18 adjacent to the section to be filled. The distributor 26, by means of the motor 50 and caster wheel 38, is positioned alongside the bed to be filled, and the height of the conveyor 44 adjusted to the height of the bed 18 to be filled. The guide 28 is moved into vertical registry with the distributor, so that it is positioned above the conveyor 44 of the distributor 26. Now, if the conveyor belts 46 and 48 are actuated, material deposited in the hopper portion 80 of the guide 28 falls through the body portion 84 of the guide, onto the conveyor 44, and is transported by the conveyor belts 46 and 48 into the bed 18. The distributor 26 may be advanced along the aisle alongside the bed, to traverse the entire bed, while the guide 28 is maintained in registry with the distributor 26.

Use of the present apparatus in the above-described manner causes compost to be fed to the bed 18 with greater uniformity than is characteristic of conventional techniques, and material can be placed along the length of the bed by advancing the distributor 26 along the aisle adjacent the bed at an appropriate rate. If desired, other beds 18 of a given tier may be filled by adjusting the height of the conveyor 44 when the distributor 26 is at a given station, before advancing the distributor 26 along the aisle. Alternatively, an entire bed 18 may be filled, and the distributor 26 then returned to the head of the aisle; the height of the conveyor 44 adjusted; and the second bed then filled.

Suitable electrical controls, not specifically illustrated, may be provided for the drive motor 50 of the distributor 26, the motor 70 of the conveyor means 44, and the drive motors, not shown, for the conveyors 30 and 32. The winch 90 may also be electrically driven, and if so, will also be provided with suitable controls. The controls may be disposed, if so desired, within a utility box 96 associated with the distributor 26. The controls will advantageously include manual reversing switches for the motors 50 and 70, as well as for the conveyors 30 and 32. Switches to control the feeder 34 and the winch 92 may also be provided in the same panel, thus enabling an operator to control the entire distribution operation from a central control point.

Power for the apparatus may be utility current, typically 240 volts at 60 Hz.

The present invention may be embodied in other specific forms without departing from its spirit or essential attributes. Accordingly, reference should be made to the appended claims, rather than the foregoing specification and drawings, as indicating the scope of the invention.

I claim:

1. For use in a mushroom house having tiers of vertically spaced mushroom cultivating beds therein, a supporting surface disposed above the beds, and feed means for supplying compost to the house, means for distributing compost to the beds, comprising: a selectively positionable distributor for feeding compost to the beds, said distributor having means for selectively adjusting said distributor to the heights of said beds, means operatively associated with said distributor to facilitate positioning of said distributor in juxtapostion to the beds along the lengths thereof and below the supporting surface, and means for supply compost to said distributor, said means for supplying compost to said distributor comprising a movable guide supported by the surface and having means thereon to facilitate movement of said guide with respect to the surface, said guide being selectively positionable to receive compost from the feed means and to be positioned above said distributor, whereby compost received by said guide from the feed means is directed to said distributor, and said distributor comprising a base portion, said means to facilitate positioning of said distributor comprising rolling support means coupled to said base portion, and conveyor means operatively coupled to and supported by said base portion, said means for adjusting said distributor to the heights of said beds comprising a vertically adjustable carriage, said conveyor means being mounted on said carriage for vertical adjustment therewith.

2. Apparatus in accordance with claim 1, wherein said guide comprises a shell having a hopper portion for receiving compost, and a body portion of reduced cross-section in communication with said hopper portion, the cross-section of said body portion corresponding to the dimensions of said transverse conveyor on said distributor.

3. Apparatus in accordance with claim 2, wherein said guide is supported by wheels adapted to rest on said support surface.

4. Apparatus in accordance with claim 1, wherein said supporting surface comprises a track, said track extending parallel to and being offset from one edge of said beds, and an opening adjacent to said track adapted to permit compost to fall from said guide to said distributor.

5. Apparatus in accordance with claim 1, and selectively operable drive means coupled to said rolling support means, and selectively operable means coupled to said carriage for vertically adjusting said carriage with respect to said base portion.

6. Apparatus in accordance with claim 5, wherein said drive means and said rolling support means facilitate movement of said distributor in a first direction, said conveyor means being disposed transversely with respect to said first direction.

7. Apparatus in accordance with claim 6, wherein said base portion comprises an upright guide, said carriage being operatively coupled to said guide for movement with respect thereto.

8. Apparatus in accordance with claim 7, and winch means on said distributor for moving said carriage with respect to said guide.

* * * * *